United States Patent [19]

Nesheiwat

[11] Patent Number: 5,008,368

[45] Date of Patent: Apr. 16, 1991

[54] PREPARATION OF POLY(ARYLENE SULFIDE/SULFONE) POLYMER WITH ADDITION OF WATER AFTER POLYMERIZATION IS INITIATED

[75] Inventor: Afif M. Nesheiwat, Chatham, N.J.

[73] Assignee: Phillips Petroleum Company, Bartlesville, Okla.

[21] Appl. No.: 389,020

[22] Filed: Aug. 3, 1989

[51] Int. Cl.$^5$ .............................................. C08G 75/14
[52] U.S. Cl. ..................................... 528/388; 528/391
[58] Field of Search .............................. 528/388, 391

[56] References Cited

U.S. PATENT DOCUMENTS

| | | | |
|---|---|---|---|
| 4,016,145 | 4/1977 | Campbell | 260/79.3 M |
| 4,102,875 | 7/1978 | Campbell | 528/388 |
| 4,127,713 | 11/1978 | Campbell | 528/391 |
| 4,301,274 | 11/1981 | Campbell | 528/388 |
| 4,645,826 | 2/1987 | Iizuka et al. | 528/338 |
| 4,808,698 | 2/1989 | Bobsein et al. | 528/388 |
| 4,812,539 | 3/1989 | Iizuka et al. | 526/62 |
| 4,812,552 | 3/1989 | Cliffton et al. | 528/226 |

*Primary Examiner*—Harold D. Anderson
*Attorney, Agent, or Firm*—Beverly M. Dollar

[57] ABSTRACT

A method for producing a poly(arylene sulfide/sulfone) polymer is provided which comprises: contacting reactants comprising a dihalogenated aromatic sulfone, an alkali metal sulfide, a polar organic compound, at least one base, an alkali metal carboxylate, and, optionally water, under suitable conditions to initiate a polymerization reaction; thereafter adding an amount of water while maintaining polymerization conditions; then terminating the reaction; and recovering the polymer.

The invention method provides for a polymer product wherein the production of low molecular weight product is minimized and high molecular weight yield is maximized.

15 Claims, No Drawings

PREPARATION OF POLY(ARYLENE SULFIDE/SULFONE) POLYMER WITH ADDITION OF WATER AFTER POLYMERIZATION IS INITIATED

This invention relates to the production of poly(arylene sulfide/sulfone) polymers. In one aspect, this invention relates to a process for the production of poly(arylene sulfide/sulfone) polymers whereby the yield of the polymer is maximized. In another aspect, this invention relates to a process for the production of poly(arylene sulfide/sulfone) polymers whereby undesirable low molecular weight products are minimized.

BACKGROUND OF THE INVENTION

Poly(arylene sulfide/sulfone) polymers are thermoplastic polymers known in the art, with processes for making these polymers disclosed in various U.S. patents, for example U.S. Pat. Nos. 4,016,145, 4,102,875, 4,127,713 and 4,301,274. Poly(arylene sulfide/sulfone) polymers are particularly useful due to their high heat and chemical resistance.

During the preparation of poly(arylene sulfide/sulfone) polymers, often low molecular weight poly(arylene sulfide/sulfone) polymer or oligomers are produced. This low molecular weight material is generally harmful to the mechanical properties of the product, and usually is separated from the higher molecular weight portions of the product. The separation of the low molecular weight product often requires additional time-consuming and expensive recovery steps. It would therefore be desirable to have a method of producing a poly(arylene sulfide/sulfone) polymer in which production of low molecular weight product is minimized and yield of high molecular weight product is maximized.

Accordingly, an object of this invention is to provide a method of producing poly(arylene sulfide/sulfone) polymers whereby the production of low molecular weight product is minimized.

Another object of this invention is to provide a process for the preparation of poly(arylene sulfide/sulfone) polymers whereby the yield of useful higher molecular weight product is maximized.

SUMMARY OF THE INVENTION

In accordance with this invention, poly(arylene sulfide/sulfone) polymers are prepared by a method comprising contacting a dihalogenated aromatic sulfone, an alkali metal sulfide, a polar organic compound, at least one base, and an alkali metal carboxylate under polymerization conditions, thereafter adding an amount of water while maintaining relatively constant polymerization conditions, then terminating the polymerization reaction and recovering the poly(arylene sulfide/sulfone) polymer.

In accordance with one embodiment of the present invention, a small amount of water is present during the initial reaction, either as water of hydration of the other reactants or as an additional reactant. In accordance with another embodiment of this invention, the alkali metal sulfide, polar organic compound, base or bases, and alkali metal carboxylate are pre-contacted, then are subjected to a dehydration step prior to adding the dihalogenated aromatic sulfone.

The invention method of adding water after polymerization has been initiated results in a product containing smaller amounts of low molecular weight material, and thus maximizes the amount of useful higher molecular weight product recovered.

DETAILED DESCRIPTION OF THE INVENTION

Dihalogenated aromatic sulfones that can be employed in the process of this invention can be represented by the formula:

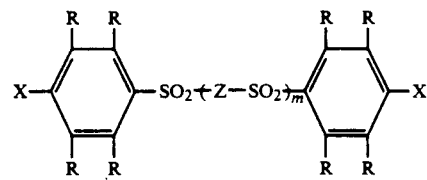

where each X is selected from the group consisting of fluorine, chlorine, bromine, and iodine; Z is a divalent radical selected from the group consisting of

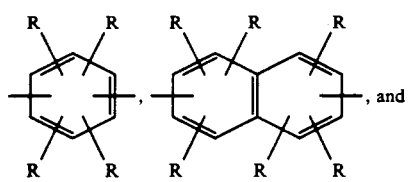

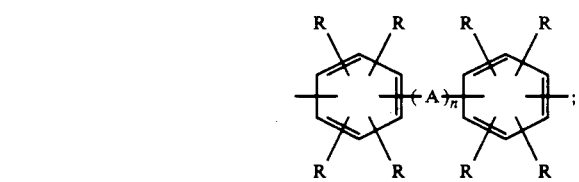

m is 0 or 1; n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, m is 0.

Examples of some dihalogenated aromatic sulfones that can be employed in the process of this invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)-benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl]ether, bis[p-(p-chlorophenylsulfonyl)phenyl]sulfide, bis[p-(p-bromophenylsulfonyl)phenyl]sulfone, bis[p-(p-bromophenylsulfonyl)phenylmethane, 5,5-bis[3-ethyl-4-(p-chlorophenylsulfonyl)phenyl]nonane, and the like, and mixtures thereof.

Alkali metal sulfides that can be employed in the process of this invention include alkali metal sulfides and bisulfides. It is preferred to use the bisulfides such as sodium bisulfide, potassium bisulfide, rubidium bisulfide, cesium bisulfide, and mixtures thereof. It is most preferred to use sodium bisulfide in this invention. The alkali metal sulfide can be used in anhydrous form, as a hydrate, or as an aqueous mixture. Preferably, the alkali metal sulfide is employed in hydrated form.

The polar organic compounds that can be used in the process of this invention should be substantially liquid at the reaction temperatures and pressures employed. The compounds can be cylic or acyclic and can have 1 to about 10 carbon atoms per molecule. Examples of some suitable compounds include amides such as formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof. The preferred polar organic compound for use in this invention is N-methyl-2-pyrrolidone (NMP).

Alkali metal carboxylates which can be employed in the process of this invention can be represented by the formula $R'CO_2M$, where $R'$ is a hydrocarbyl radical selected from alkyl, cycloalkyl, and aryl, and combinations thereof, such as alkylaryl, arylalkyl, and the like, and the number of carbon atoms in $R'$ is within the range of 1 to about 20, and M is an alkali metal. If desired, the alkali metal carboxylate can be employed as a hydrate or as a solution or dispersion in water. It is preferred to use a sodium carboxylate in this invention.

Examples of some sodium carboxylates which can be employed in the process of this invention include sodium acetate, sodium propionate, sodium 2-methylpropionate, sodium butyrate, sodium valerate, sodium hexanoate, sodium heptanoate, sodium 2-methyloctanoate, sodium dodecanoate, sodium 4-ethyltetradecanoate, sodium octadecanoate, sodium heneiosanoate, sodium cyclohexanecarboxylate, sodium cyclododecanecarboxylate, sodium 3-methylcyclopentanecarboxylate, sodium cyclohexylacetate, sodium benzoate, sodium m-toluate, sodium phenylacetate, sodium 4-phenylcyclohexanecarboxylate, sodium p-tolylacetate, sodium 4-ethylcyclohexylacetate, and the like, and mixtures thereof. The most preferred sodium carboxylate for use in this invention is sodium acetate.

At least one base is used in this invention. Bases are selected from alkali metal hydroxides, alkali metal carbonates, and mixtures of alkali metal hydroxides with alkali metal carbonates. Suitable alkali metal hydroxides include lithium hydroxide, sodium hydroxide, potassium hydroxide, rubidium hydroxide, and cesium hydroxide. Suitable alkali metal carbonates include lithium carbonate, sodium carbonate, potassium carbonate, rubidium carbonate, and cesium carbonate. If desired, the base can be employed as an aqueous solution.

Although the mole ratio of dihalogenated aromatic sulfone to alkali metal sulfide can vary over a considerable range, generally it will be within the range of about 0.9:1 to about 2:1, preferably about 0.95:1 to about 1.2:1. The mole ratio of alkali metal carboxylate to alkali metal sulfide can vary over a wide range but generally will be within the range of about 0.05:1 to about 4:1, preferably about 0.1:1 to about 2:1. Although the mole ratio of polar organic compound to alkali metal sulfide can vary greatly, generally it will be within the range of about 1:1 to about 25:1, preferably about 2:1 to about 8:1. The molar ratio of base to the alkali metal sulfide is about 0.5:1 to about 4:1, preferably about 0.5:1 to about 2.05:1.

Although the reaction temperature at which the polymerization is initiated can vary over a considerable range, generally it will be within the range of about 150° C. to about 240° C., preferably about 180° C. to about 220° C. The pressure should be sufficient to maintain the dihalogenated aromatic sulfone, the organic amide, and the water substantially in the liquid phase.

In one embodiment of this invention, water is present at the initiation of the polymerization. As indicated above, the water can be employed as a reactant, and/or it can be added as a hydrate of, and/or as a medium for, the alkali metal sulfide, the base or bases and/or the alkali metal carboxylate.

The amount of water present at the initiation of the polymerization can range from a negligible amount to about 30 moles per mole alkali metal sulfide, although it is preferred to employ less than about 5 moles water per mole sulfide as an initial reactant, including any water introduced as a medium for, or hydrate of, another reactant.

In another embodiment of this invention, the alkali metal sulfide, polar organic compound, the base or bases and alkali metal carboxylate are contacted, and the resulting mixture subjected to a dehydration step prior to contacting the dihalogenated aromatic sulfone.

The pre-contacted reactants can be added in any order. The dehydration step can be performed by any method known to those skilled in the art and should result in the partial or substantial elimination of water from the reactants.

Subsequent to the initiation of the polymerization which is accomplished by contacting all of the reactants and achieving a temperature in the range indicated above, an additional amount of water is added to the reactor contents. The amount of water added is generally in the range of 2 to 10 moles per mole sulfide. The water can be added at any time after the initiation of the polymerization, however, it is preferred to add the water within one hour after the intended polymerization temperature has been achieved. The water can be added at ambient conditions, or it may be heated to the temperature of the reactor contents before addition.

The polymerization conditions present before the addition of the water are maintained essentially constant during and after the addition of the water.

After the addition of water to the reactor contents, the reaction is allowed to continue for a period of time.

The reaction time can vary widely, depending in part on the reaction temperature, but generally will be within the range of about 10 minutes to about 3 days, preferably about 1 hour to about 8 hours. The reaction is terminated by cooling the reactor contents to a temperature in the range of 20° to 150° C.

The poly(arylene sulfide/sulfone) polymers produced by the process of this invention can be separated from the reaction mixture by conventional procedures, e.g., by filtration of the polymer, followed by washing with water, or by dilution of the reaction mixture with water, followed by filtration and water washing of the polymer. If desired, at least a portion of the washing with water can be conducted at an elevated temperature, e.g., up to about 250° C. Water-miscible solvents such as acetone or methanol can be used to assist in the washing with water, if desired.

The poly(arylene sulfide/sulfone) polymers produced by the process of this invention can be blended with fillers, pigments, extenders, other polymers, and the like. They can be cured through crosslinking and/or chain extension, e.g., by heating at temperatures up to about 480° C. in the presence of a free oxygen-containing gas, to provide cured products having high thermal stability and good chemical resistance. They are useful in the production of coatings, films, molded objects, and fibers.

The following Examples are intended to further illustrate this invention, and should not be construed to limit the scope of the invention.

EXAMPLES

Example 1

This example illustrates the invention process wherein water is charged during polymerization, and the only water present initially is that present in the aqueous sodium hydrogen sulfide solution charged.

To a one-gallon, stainless steel, stirred reactor was charged 290.0 g. (1.01 moles) of bis(p-chlorophenyl)sulfone, 40.17 g. (1.0 mole) of sodium hydroxide, 95.35 g. of 58.8 weight percent aqueous sodium hydrogen sulfide (1.0 moles), 3.28 g. (0.04 mole) of sodium acetate and 800 cc (7.53 moles) of N-methyl-2-pyrrolidone (NMP). The reactor was purged with nitrogen, sealed and heated to 200° C. with stirring. When the temperature reached 200° C., 115 cc distilled water was slowly added to the reactor. After 4 hours at 200° C. (including the time required to add the water), the heat was terminated and 350 cc NMP plus 125 cc distilled water were added to the reactor. The reactor was cooled slowly with air to 125° C. at which point the reactor was opened to reveal light yellow granular particles and a very fine material. The granular material was recovered on a 100 mesh screen, washed, rinsed and dried to yield 236.9 g (95.5% recoverable yield) of a polymer with an IV (determined at 30° C. in NMP at a concentration of 0.5 g polymer per 100 ml of solution) of 0.48.

Example 2

Comparison

In this example, Example 1 is essentially duplicated except that the 115 cc of water added during polymerization in Example 1 was instead added with the initial charge of reactants and no water was added during the polymerization.

To a one-gallon, stainless steel, stirred reactor was charged 290.0 g. (1.01 moles) of bis(p-chlorophenyl)sulfone, 40.17 g. (1.0 mole) of sodium hydroxide, 95.35 g. of 58.8 weight percent aqueous sodium hydrogen sulfide (1.0 moles), 3.28 g. (0.04 mole) of sodium acetate, 800 cc (7.53 moles) of N-methyl-2-pyrrolidone (NMP) and 115 cc distilled water. The reactor was purged with nitrogen, sealed, heated to 200° C. with stirring and held under these conditions for four hours. After 4 hours at 200° C., heat was terminated and 350 cc NMP plus 125 cc distilled water were added to the reactor. The reactor was cooled slowly with water to 125° C. at which point the reactor was opened to reveal light tan granular particles and a very fine material. The granular material was recovered on a 100 mesh screen, washed, rinsed and dried to yield 226.1 g (91.2% recoverable yield) of a polymer with an IV (determined as in Example 1) of 0.465.

Comparing these results with those of Example 1 shows that the Invention Run of Example 1 produced a higher yield of product with a higher molecular weight (evidenced by the Higher IV).

Example 3

This example illustrates another embodiment of the invention wherein some water is initially charged as a reactant. This run is similar to inventive Example 1 except that here more water is charged initially and less is charged during polymerization.

To a one-gallon, stainless steel, stirred reactor was charged 574.3 g. (2.0 moles) of bis(p-chlorophenyl)sulfone, 80.34 g. (2.0 mole) of sodium hydroxide, 190.7 g. of 58.8 weight percent aqueous sodium hydrogen sulfide (2.0 moles), 8.2 g. (0.10 mole) of sodium acetate, 1400 cc (13.2 moles) of N-methyl-2-pyrrolidone (NMP) and 120 cc water. The reactor was purged with nitrogen, sealed and heated to 200° C. with stirring. When the temperature reached 200° C., 145 cc distilled water was added to the reactor. After 4 hours at 200° C. (including the time required to add the water), heat was terminated and 300 cc NMP plus 100 cc distilled water were added to the reactor. The reactor was cooled slowly with air to 125° C. at which point the reactor was opened to reveal medium to large yellow granular particles and a very fine material. The granular material was recovered on a 100 mesh screen, washed, rinsed and dried to yield 475.8 g (95.9% recoverable yield) of a polymer with an IV (determined as in Example 1) of 0.51.

Example 4

Comparison

This example is similar to inventive Example 3 except that here more water is charged initially and none is charged during polymerization.

To a one-gallon, stainless steel, stirred reactor was charged 574.3 g. (2.0 moles) of bis(p-chlorophenyl)sulfone, 80.34 g. (2.0 mole) of sodium hydroxide, 190.7 g. of 58.8 weight percent aqueous sodium hydrogen sulfide (2.0 moles), 8.2 g. (0.10 mole) of sodium acetate, 1400 cc (13.2 moles) of N-methyl-2-pyrrolidone (NMP) and 180 cc water. The reactor was purged with nitrogen, sealed, heated to 200° C. with stirring and held under these conditions for 4 hours. After 4 hours at 200° C., heat was terminated and 300 cc NMP plus 180 cc distilled water were added to the reactor. The reactor was cooled slowly with air to 125° C. at which point the reactor was opened to reveal uniform yellow granular particles and fine material. The granular material was recovered on a 100 mesh screen, washed, rinsed and dried to yield 456.2 g (92.5% recoverable yield) of a polymer with an IV (determined as in Example 1) of 0.33.

A comparison of these results with those of Example 3 shows that the invention run in Example 3 produced a higher yield of a higher molecular weight product.

Examples 5 and 6

Examples 5 and 6 further illustrate the invention by demonstrating the effect of adding water at different times during polymerization.

Example 5

To a one-gallon, stainless steel, stirred reactor was charged 574.3 g. (2.0 moles) of bis(p-chlorophenyl)sulfone, 80.34 g. (2.0 mole) of sodium hydroxide, 190.7 g. of 58.8 weight percent aqueous sodium hydrogen sulfide (2.0 moles), 6.56 g. (0.08 mole) of sodium acetate and 1400 cc (13.2 moles) of N-methyl-2-pyrrolidone (NMP). The reactor was purged with nitrogen, sealed and heated to 200° C. with stirring. When the temperature reached 200° C., 266 cc distilled water was added to the reactor. After 4 hours at 200° C. (including the time required to add the water), heat was terminated and 300 cc NMP plus 100 cc distilled water were added to the reactor. The reactor was cooled slowly with air to 125° C. at which point the reactor was opened to reveal small yellow granular particles and a very fine material. The granular material was recovered on a 100 mesh screen, washed, rinsed and dried to yield 483.6 g (97.5% recoverable yield) of a polymer with an IV (determined as in Example 1) of 0.68.

Example 6

The run of Example 5 was repeated except that the 266 cc of water added during the polymerization was added 20 minutes after achieving 200° C. rather than immediately after achieving 200° C. Opening the reactor revealed yellow granular particles with a chunk of polymer on the reactor coil and a ring of polymer around the top of the reactor. Very fine material was also present. The granular material was recovered on a 100 mesh screen, washed, rinsed and dried to yield 478.4 g (96.5% recoverable yield) of a polymer with an IV (determined as in Example 1) of 0.56.

Comparing the results of Examples 5 and 6 indicates that adding water during polymerization immediately after achieving the final intended polymerization temperature rather than later during the polymerization produces a somewhat higher yield of a somewhat higher molecular weight product which exists in a more desirable form.

While this invention has been described in detail for purposes of illustration, it is not meant to be limited thereby, but is intended to cover all reasonable modifications within the spirit and scope thereof.

That is claimed is:

1. A method of producing a poly(arylene sulfide/sulfone) polymer which comprises:
   (a) contacting reactants comprising an alkali metal sulfide, a dihalogenated aromatic sulfone, a polar organic compound, at least one base and an alkali metal carboxylate under suitable conditions to initiate a polymerization reaction,
   (b) thereafter adding an amount of water while maintaining polymerization conditions,
   (c) terminating the polymerization reaction, and
   (d) recovering the poly(arylene sulfide/sulfone) polymer.

2. A method according to claim 1 wherein said alkali metal sulfide is sodium bisulfide, said dihalogenated aromatic sulfone is p,p'-dichlorodiphenylsulfone, said polar organic compound is N-methyl-2-pyrrolidone, said alkali metal carboxylate is sodium acetate and said at least one base is sodium hydroxide.

3. A method according to claim 1 wherein said reactants in step (a) further comprise a small amount of water.

4. A method according to claim 1 wherein said alkali metal sulfide, said alkali metal carboxylate, said at least one base and said polar organic compound are contacted and the resulting mixture subjected to a dehydration step prior to contacting said mixture with said dihalogenated aromatic sulfone.

5. A method according to claim 2 wherein the molar ratio of said polar organic compound to said sulfide is in the range of 1:1 to 25:1.

6. A method according to claim 5 wherein the molar ratio of said base to said sulfide is in the range of 0.5:1 to 4:1.

7. A method according to claim 6 wherein the molar ratio of said alkali metal carboxylate to said sulfide is in the range of 0.04:1 to 4:1.

8. A method according to claim 7 wherein the molar ratio of said dihalogenated aromatic sulfone to said sulfide is in the range of 0.9:1 to 2:1.

9. A method according to claim 3 wherein the molar ratio of said water added as a reactant in step (a) ranges from a negligible amount to 30 moles water per mole sulfide.

10. A method according to claim 9 wherein the amount of water added in step (b) is in the range of 2 to 10 moles water per mole of sulfide.

11. A method according to claim 4 wherein the amount of water added in step (b) is in the range of 2 to 10 moles water per mole sulfide.

12. A method according to claim 1 wherein said suitable conditions comprise a temperature in the range of 150° to 240° C.

13. A method according to claim 1 wherein said step (b) addition of water is performed within one hour of achieving the intended polymerization temperature, and a temperature in the range of 150° to 240° C.

14. A method according to claim 1 wherein said step (c) termination of the polymerization reaction occurs during the time period of 1 to 20 hours after the step (b) addition of water.

15. A method according to claim 13 wherein said step (c) termination is accomplished by cooling the contents to a temperature in the range of 20° to 150° C.

* * * * *